US011800079B2

(12) United States Patent
Zheng et al.

(10) Patent No.: US 11,800,079 B2
(45) Date of Patent: Oct. 24, 2023

(54) IMAGE PROCESSING METHOD, IMAGE DISPLAY METHOD AND IMAGE DISPLAY SYSTEM

(71) Applicants: BEIJING BOE OPTOELECTRONICS TECHNOLOGY CO., LTD., Beijing (CN); BOE Technology Group Co., Ltd., Beijing (CN)

(72) Inventors: Chao Zheng, Beijing (CN); Jinghua Miao, Beijing (CN); Xuefeng Wang, Beijing (CN); Qingwen Fan, Beijing (CN); Shuai Hao, Beijing (CN); Hao Zhang, Beijing (CN); Lili Chen, Beijing (CN); Jinbao Peng, Beijing (CN); Wenyu Li, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/359,506

(22) Filed: Jun. 26, 2021

(65) Prior Publication Data

US 2022/0159230 A1 May 19, 2022

(30) Foreign Application Priority Data

Nov. 19, 2020 (CN) .......................... 202011301129.8

(51) Int. Cl.
*H04N 13/139* (2018.01)
*H04N 13/194* (2018.01)
(Continued)

(52) U.S. Cl.
CPC ......... *H04N 13/139* (2018.05); *H04N 13/194* (2018.05); *H04N 13/344* (2018.05); *H04N 13/383* (2018.05)

(58) Field of Classification Search
CPC .. H04N 13/139; H04N 13/194; H04N 13/344; H04N 13/383; H04N 13/302; H04N 13/356; H04N 13/368
See application file for complete search history.

(56) References Cited

U.S. PATENT DOCUMENTS 9,787,977 B2* 10/2017 Bernard ................. G02B 30/34
10,656,720 B1* 5/2020 Holz ....................... G06F 3/011
(Continued)

FOREIGN PATENT DOCUMENTS

CN 102789769 A 11/2012
CN 105635624 A 6/2016
(Continued)

OTHER PUBLICATIONS

Office Action dated Aug. 18, 2023 for Chinese Patent Application No. 202011301129.8 and English Translation.

*Primary Examiner* — Gims S Philippe
(74) *Attorney, Agent, or Firm* — Ling Wu; Stephen Yang; Ling and Yang Intellectual Property

(57) ABSTRACT

An image processing method includes determining a display mode; processing, according to an image processing manner corresponding to the display mode, original image data to obtain target image data; and transmitting the target image data to an image display terminal, so that the image display terminal performs image display according to a scanning display manner corresponding to the display mode, a resolution of the target image data is less than or equal to that of the original image data, and the target image data carries indication information of the display mode.

16 Claims, 10 Drawing Sheets

(51) Int. Cl.
    *H04N 13/344*    (2018.01)
    *H04N 13/383*    (2018.01)

(56) References Cited

U.S. PATENT DOCUMENTS

| | | | | |
|---|---|---|---|---|
| 10,674,133 | B2* | 6/2020 | Oh | G06F 3/0482 |
| 2002/0180734 | A1* | 12/2002 | Endoh | G06F 3/04815 |
| | | | | 345/428 |
| 2006/0279750 | A1* | 12/2006 | Ha | H04N 13/178 |
| | | | | 358/1.9 |
| 2015/0317768 | A1 | 11/2015 | Chen | |
| 2021/0134200 | A1* | 5/2021 | Ha | G09G 3/007 |
| 2021/0364988 | A1* | 11/2021 | Hornstein | H04N 13/351 |

FOREIGN PATENT DOCUMENTS

| | | |
|---|---|---|
| CN | 105847789 A | 8/2016 |
| CN | 110267025 A | 9/2019 |
| CN | 110383811 A | 10/2019 |
| CN | 111192544 A | 5/2020 |
| JP | 2012-165358 A | 8/2012 |

* cited by examiner

IMAGE PROCESSING METHOD, IMAGE DISPLAY METHOD AND IMAGE DISPLAY SYSTEM

CROSS-REFERENCE TO RELATED APPLICATION

The present application claims the priority of Chinese Patent Application No. 202011301129.8 filed to the CNIPA on Nov. 19, 2020, the content of which is hereby incorporated by reference.

TECHNICAL FIELD

Embodiments of the present disclosure relate to, but are not limited to, the technical field of image processing, and in particular to an image processing method, an image display method and an image display system.

BACKGROUND

With the improvement of resolutions and refresh rates of display devices (for example, a display device in a virtual reality system), an amount of image data transmitted by a computer device to a display device is increasing, and the requirements for transmission bandwidths are increasing.

SUMMARY

The following is a summary of subject matters described in detail in the present disclosure. This summary is not intended to limit the protection scope of the claims.

Embodiments of the present disclosure provide an image processing method, an image display method and an image display system.

In one aspect, the embodiments of the present disclosure provide an image processing method, including: determining a display mode; processing, according to an image processing manner corresponding to the display mode, original image data to obtain target image data; and transmitting the target image data to an image display terminal, so that the image display terminal performs image display according to a scanning display manner corresponding to the display mode, wherein a resolution of the target image data is less than or equal to that of the original image data, and the target image data carries indication information of the display mode.

In some exemplary embodiments, the display mode is one of the following modes: a normal display mode, a two-dimensional display mode, a three-dimensional display mode and a stereoscopic light field display mode.

In some exemplary embodiments, said determining a display mode includes at least one of the following steps: determining, according to a type of a running application, a display mode matched with the type of the application; and determining, in response to a user operation, a display mode selected by the user operation.

In some exemplary embodiments, before processing the original image data, the method further includes: starting a single-person mode or a multi-person mode according to a quantity of persons who are watching at the same time at the image display terminal and eye gaze parameters of each person; and said processing, according to an image processing manner corresponding to the display mode, original image data to obtain target image data includes: processing the original image data according to an image processing manner in the single-person mode or the multi-person mode corresponding to the display mode to obtain the target image data.

In some exemplary embodiments, said starting a single-person mode or a multi-person mode according to a quantity of persons who are watching at the same time at the image display terminal and eye gaze parameters of each person includes: when the quantity of persons who are watching at the same time at the image display terminal is one, or the quantity of persons who are watching at the same time at the image display terminal is more than one and the eye gaze parameters of the plurality of persons indicate the same gaze area, starting the single-person mode; and when the quantity of persons who are watching at the same time at the image display terminal is more than one and the eye gaze parameters of the plurality of persons indicate at least two gaze areas, starting the multi-person mode.

In some exemplary embodiments, the display mode is a normal display mode, and a resolution of the target image data obtained according to an image processing manner in a single-person mode or multi-person mode corresponding to the normal display mode is the same as that of the original image data.

In some exemplary embodiments, the display mode is a two-dimensional display mode. Said processing the original image data according to an image processing manner in the single-person mode or the multi-person mode corresponding to the display mode to obtain the target image data includes: dividing an original image corresponding to the original image data into at least one gaze area and a plurality of non-gaze areas according to the eye gaze parameters collected at the image display terminal, sampling the at least one gaze area using an original resolution to obtain at least one gaze image, and sampling the plurality of non-gaze areas using a compressed resolution to obtain a plurality of corresponding non-gaze images; and splicing the at least one gaze image and the plurality of non-gaze images to obtain the target image data.

In some exemplary embodiments, said processing the original image data according to an image processing manner in the multi-person mode corresponding to the display mode to obtain the target image data further includes: segmenting the at least one gaze image to form a plurality of rectangular gaze sub-images; and rearranging the plurality of gaze sub-images and the plurality of non-gaze images to subsequently obtain the target image data.

In some exemplary embodiments, the display mode is a three-dimensional display mode, and the original image data includes a left eye image and a right eye image; and said processing the original image data according to an image processing manner in the single-person mode or the multi-person mode corresponding to the display mode to obtain the target image data includes: dividing, according to the eye gaze parameters collected at the image display terminal, the left eye image into at least one first gaze area and a plurality of first non-gaze areas, dividing the right eye image into at least one second gaze area and a plurality of second non-gaze areas, sampling the at least one first gaze area and the at least one second gaze area using an original resolution to obtain at least one first gaze image and at least one second gaze image, and sampling the plurality of first non-gaze areas and the plurality of second non-gaze areas using a compressed resolution to obtain a plurality of first non-gaze images and a plurality of second non-gaze images; and splicing the at least one first gaze image, the at least one second gaze image, the plurality of first non-gaze images and the plurality of second non-gaze images to obtain the target image data.

In some exemplary embodiments, the display mode is a stereoscopic light field display mode, and the original image data includes a plurality of unit images; and said processing the original image data according to an image processing manner in the single-person mode or the multi-person mode corresponding to the display mode to obtain the target image data includes: for any unit image, dividing the unit image into at least one gaze area and a plurality of non-gaze areas according to the eye gaze parameters collected at the image display terminal, sampling the at least one gaze area using an original resolution to obtain at least one gaze image, and sampling the plurality of non-gaze areas using a compressed resolution to obtain a plurality of non-gaze images; and splicing a plurality of gaze images and the plurality of non-gaze images obtained according to the plurality of unit images to obtain the target image data, wherein the target image data includes a plurality of frames of image data.

In another aspect, the embodiments of the present disclosure provide an image display method, including: receiving target image data; determining a display mode by analyzing the target image data; and performing image display on a display at an image display terminal according to a scanning display manner corresponding to the display mode.

In some exemplary embodiments, the display mode is one of the following modes: a normal display mode, a two-dimensional display mode, a three-dimensional display mode, and a stereoscopic light field display mode.

In some exemplary embodiments, said performing image display on a display at an image display terminal according to a scanning display manner corresponding to the display mode includes: when the display mode is a normal display mode, displaying an image to be displayed on the display according to a relationship between a resolution of the display at the image display terminal and a resolution of the image to be displayed corresponding to the target image data; when the display mode is a two-dimensional display mode, displaying a gaze image in the image to be displayed in a gaze area of the display and displaying a non-gaze image in the image to be displayed in a non-gaze area of the display by reducing the resolution according to the relationship between the resolution of the display at the image display terminal and the resolution of the image to be displayed corresponding to the target image data; when the display mode is a three-dimensional display mode, displaying gaze images corresponding to a left eye image and a right eye image in a fusion manner in a gaze area of the display and displaying a non-gaze image in the image to be displayed in a non-gaze area of the display by reducing the resolution according to the relationship between the resolution of the display at the image display terminal and the resolution of the image to be displayed corresponding to the target image data; and when the display mode is a stereoscopic light field display mode, displaying gaze images corresponding to a plurality of unit images in a fusion manner or time-division multiplexing manner in a gaze area of the display and displaying a non-gaze image in the image to be displayed in a non-gaze area of the display by reducing the resolution according to the relationship between the resolution of the display at the image display terminal and the resolution of the image to be displayed corresponding to the target image data.

In another aspect, the embodiments of the present disclosure provide an image display system, including: an image processing terminal and an image display terminal. The image processing terminal is configured to determine a display mode, process original image data according to an image processing manner corresponding to the display mode to obtain target image data, and transmit the target image data to the image display terminal, wherein a resolution of the target image data is less than or equal to that of the original image data, and the target image data carries indication information of the display mode. The image display terminal is configured to receive the target image data, determine the display mode by analyzing the target image data, and perform image display on a display at the image display terminal according to a scanning display manner corresponding to the display mode.

In some exemplary embodiments, the display mode is one of the following modes: a normal display mode, a two-dimensional display mode, a three-dimensional display mode, and a stereoscopic light field display mode.

In some exemplary embodiments, the image processing terminal is configured to determine the display mode in one of the following manners: determining, according to a type of a running application, a display mode matched with the type of the application; and determining, in response to a user operation, a display mode selected by the user operation.

In another aspect, the embodiments of the present disclosure provide a terminal device, including: a memory and a processor, wherein the memory stores a computer program which, when executed by the processor, implements any image processing method described above.

In another aspect, the embodiments of the present disclosure provide a terminal device, including: a display, a memory, and a processor, wherein the display is connected with the processor and is configured to provide a display interface, and the memory stores a computer program which, when executed by the processor, implements any image display method described above.

In another aspect, the embodiments of the present disclosure provide a non-transitory computer readable storage medium, storing a computer program which, when executed by a processor, implements any image processing method described above.

In another aspect, the embodiments of the present disclosure provide a non-transitory computer readable storage medium, storing a computer program which, when executed by a processor, implements any image display method described above.

Other aspects will become apparent after the drawings and the detailed description are read and understood.

BRIEF DESCRIPTION OF DRAWINGS

The attached drawings are for providing a further understanding of the technical scheme of the present disclosure and constitute a part of the description. They are for explaining the technical scheme of the present disclosure together with the embodiments of the present application and do not constitute a limitation on the technical scheme of the present disclosure. Shapes and sizes of one or more components in the accompanying drawings do not reflect real scales, and are only for a purpose of schematically illustrating contents of the present disclosure.

DETAILED DESCRIPTION

Figure 1:
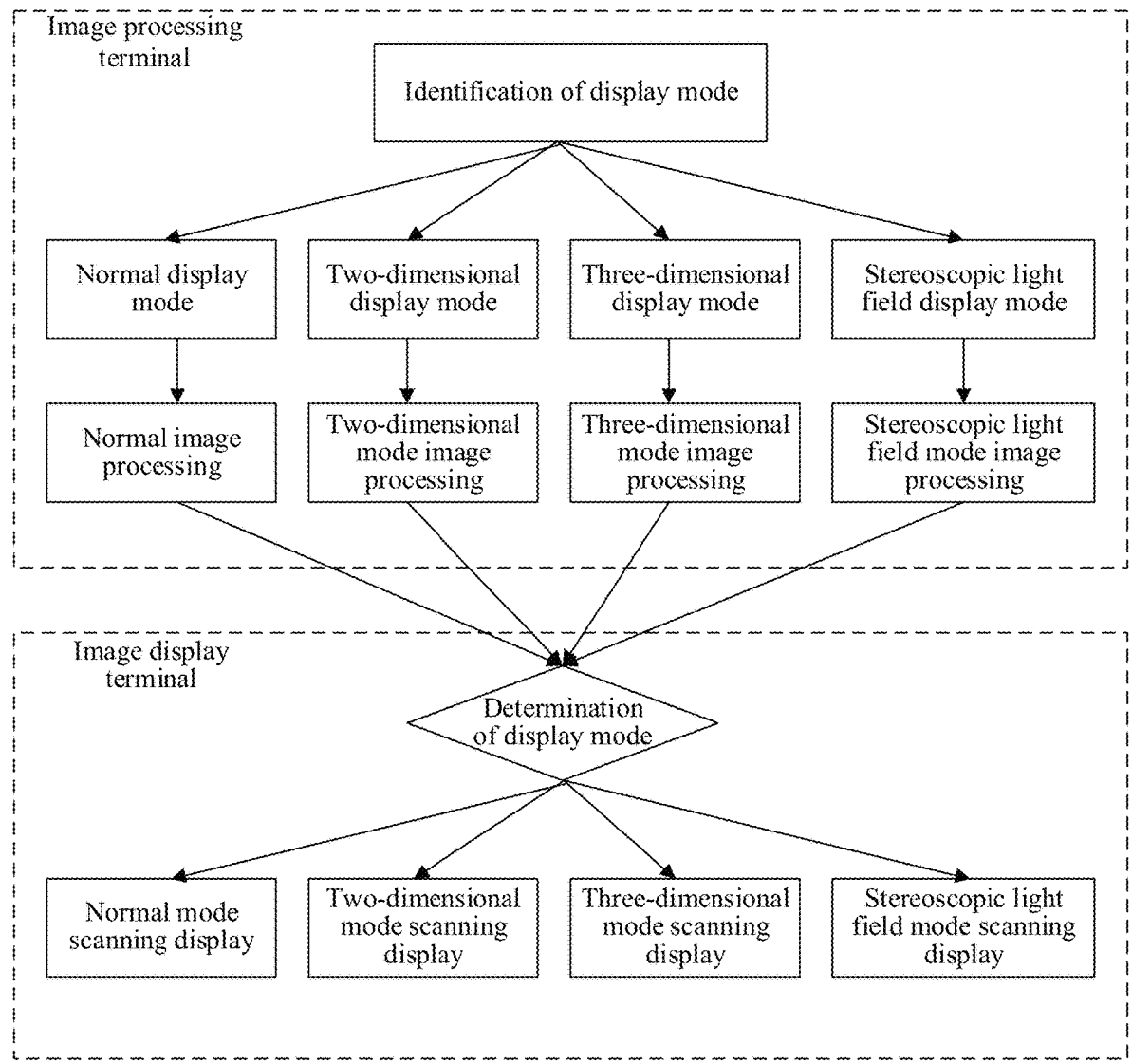
FIG. 1 is a schematic diagram of an image display system according to at least one embodiment of the present disclosure.

A plurality of embodiments are described in the present disclosure, but the description is exemplary rather than restrictive, and it is apparent to those of ordinary skills in the art that there may be more embodiments and implementation solutions within the scope of the embodiments described in the present disclosure. Although many possible combinations of features are shown in the drawings and discussed in the embodiments, many other combinations of the disclosed features are also possible. Unless specifically limited, any feature or element of any embodiment may be used in combination with or in place of any other feature or element of any other embodiment.

The present disclosure includes and contemplates combinations of features and elements known to those of ordinary skilled in the art. The disclosed embodiments, features and elements of the present disclosure may be combined with any conventional features or elements to form a unique inventive scheme defined by the claims. Any feature or element of any embodiment may also be combined with features or elements from other inventive solutions to form another unique inventive solution defined by the claims. Therefore, it should be understood that any of the features shown and discussed in the present disclosure may be implemented individually or in any suitable combination. Therefore, the embodiments are not otherwise limited except in accordance with the appended claims and equivalents thereof. In addition, various modifications and changes may be made within the protection scope of the appended claims.

Furthermore, when describing representative embodiments, the specification may have presented a method or process as a specific order of acts. However, to the extent that the method or process does not depend on the specific order of steps described in the present disclosure, the method or process should not be limited to the specific order of steps described. As those of ordinary skills in the art will understand, other orders of steps are also possible. Therefore, the specific order of steps set forth in the specification should not be interpreted as limiting the claims. Furthermore, the claims for the method or process should not be limited to performing the acts in the order of its acts, and those skilled in the art may easily understand that these orders may be varied but still remain within the essence and scope of the embodiments of the present disclosure.

The "first", "second", "third" and other ordinal numbers in the present disclosure are used to avoid confusion of constituent elements, not to provide any quantitative limitation. In the description of the present disclosure, "plurality of" means two or more counts.

Embodiments of the present disclosure provide an image processing method, an image display method and an image display system, which may provide a plurality of display modes to meet the display requirements of users in different scenes. In addition, the display effect may be ensured while reducing an amount of transmitted data and reducing a transmission pressure.

At least one embodiment of the present disclosure provides an image display system including an image processing terminal and an image display terminal. The image processing terminal is configured to determine a display mode, process original image data according to an image processing manner corresponding to the display mode to obtain target image data, and transmit the target image data to the image display terminal. A resolution of the target image data is less than or equal to that of the original image data, and the target image data carries indication information of the display mode. The image display terminal is configured to receive the target image data, determine a display mode by analyzing the target image data, and perform image display on a display at the image display terminal according to a scanning display manner corresponding to the display mode.

The image display system according to the exemplary embodiment of the present disclosure supports switching display modes according to user requirements, the image processing terminal performs image processing in a data processing manner corresponding to a display mode, and the image display terminal performs image display in a scanning display manner corresponding to the display mode, so that each display mode may achieve the best display state and meet users' requirements in different use scenarios.

The solution according to this embodiment will be illustrated by taking the image display system being a virtual reality system as an example. Virtual Reality (VR) technology is a computer simulation system which may create and experience a virtual world, and generate a simulation environment using a computer, and is a simulation system achieving multi-source information fusion and interactive three-dimensional dynamic scene and entity behavior.

FIG. 1 is a schematic diagram of an image display system according to at least one embodiment of the present disclosure. In some exemplary embodiments, as shown in FIG. 1, the image display system includes an image processing terminal and an image display terminal. The image processing terminal may be a programmable processing device capable of outputting images, such as a Personal Computer (PC). The image display terminal may be a display device having a high resolution and a high refresh rate, including, for example, a liquid crystal display or an Organic Light Emitting Diode (OLED) display. The image processing terminal and the image display terminal may be connected in a wired manner (for example, signal lines) or a wireless manner (for example, WIFI, Bluetooth, etc.) to realize data communication therebetween. However, this is not limited in the present exemplary embodiment.

In some examples, as shown in FIG. 1, the image processing terminal is configured to identify a display mode, process original image data in an image processing manner corresponding to the display mode to obtain target image data, and transmit the target image data to the image display terminal. Here, the target image data carries indication information of the display mode. For example, the indication information of the display mode may be a mode label, which may be added to a data header of the target image data. After receiving the target image data, the image display terminal determines the display mode by analyzing the target image data, and then performs image display on the display in a scanning display manner corresponding to the display mode. Here, the image display terminal may parse the indication information of the display mode from the data header of the target image data, determine the display mode according to the indication information, and then perform image display in the scanning display manner corresponding to the display mode.

In some examples, the image processing system is provided with a plurality of display modes, including, for example, a normal display mode, a two-dimensional display mode, a three-dimensional display mode, and a stereoscopic light field display mode. Here, the normal display mode may be applied to ordinary office scenes, the two-dimensional display mode may be applied to game scenes, the three-dimensional display mode may be applied to movie scenes, and the three-dimensional light field display mode may be applied to design scenes. In this exemplary embodiment, by designing the plurality of display modes applicable for different scenes, and matching each display mode with a corresponding image processing manner and a corresponding scanning display manner, the display requirements in different usage scenes may be met, thereby improving the user experience. However, kinds of the display modes are not limited in this exemplary embodiment. In some examples, a corresponding display mode may be designed according to display requirements in practical usage scenes.

In some examples, the image processing terminal may run a display mode self-identification switching service, and determine a display mode which meets the current requirements using an identification result of the display mode self-identification switching service. For example, an application type to which an application belongs may be identified by the application information started by the image processing terminal, and a display mode matched with the type of the application is determined. Here, the application information may include at least one of a digital signature of an application developer and an application name. In some examples, after a corresponding display mode is determined when an application is started for a first time, a correspondence relationship between the application and a display mode may be recorded, and when the application is started again, the corresponding display mode may be started directly according to the recorded correspondence relationship. Alternatively, in some examples, a display mode may be determined according to a user operation. For example, a user may manually select a display mode on an operation interface at the image processing terminal, to select a display mode matched with a current usage scene from a plurality of display modes. However, this is not limited in the present exemplary embodiment.

In some examples, before determining the display mode, the image processing terminal may distinguish whether the current usage scene is in a single-person mode or a multi-person mode. Then, after determining the display mode, the image processing terminal performs image processing according to an image processing manner in the single-person mode or an image processing manner in the multi-person mode corresponding to the display mode. However, this is not limited in the present exemplary embodiment. In some examples, after determining the display mode, the image processing terminal may further distinguish whether the current usage scene is in a single-person mode or a multi-person mode, and then perform image processing according to an image processing manner in the single-person mode or an image processing manner in the multi-person mode corresponding to the display mode. In this exemplary embodiment, by distinguishing the single-person mode from the multi-person mode and providing different image processing manners in combination with the display mode, the transmitted data may be reduced on the premise of ensuring the watching effect of each person, thereby ensuring the image display effect and improving the user experience.

In some examples, it is detected whether there are many persons watching the display at the same time through a face detection device at the image display terminal. If only one face is detected (that is, a quantity of persons watching the display at the same time is one), the single-person mode is started; and if a plurality of faces are detected (that is, the quantity of persons watching the display at the same time is more than one), the multi-person mode is started. Here, a gaze area of each person is calculated according to eye gaze parameters of the person (for example, binocular conditions of each face), and the gaze area of each person is analyzed. If all the persons gaze at the same gaze area, the single-person mode is started, and if all the persons gaze two or more gaze areas, the multi-person mode is started. In this exemplary embodiment, the manner of determining the gaze area according to the eye gaze parameters of each person is not limited, and those skilled in the art may use a general algorithm to implement this manner, which therefore will not be described in detail here.

The following illustrates image processing manners and scanning display manners in the four display modes.

Figure 2:
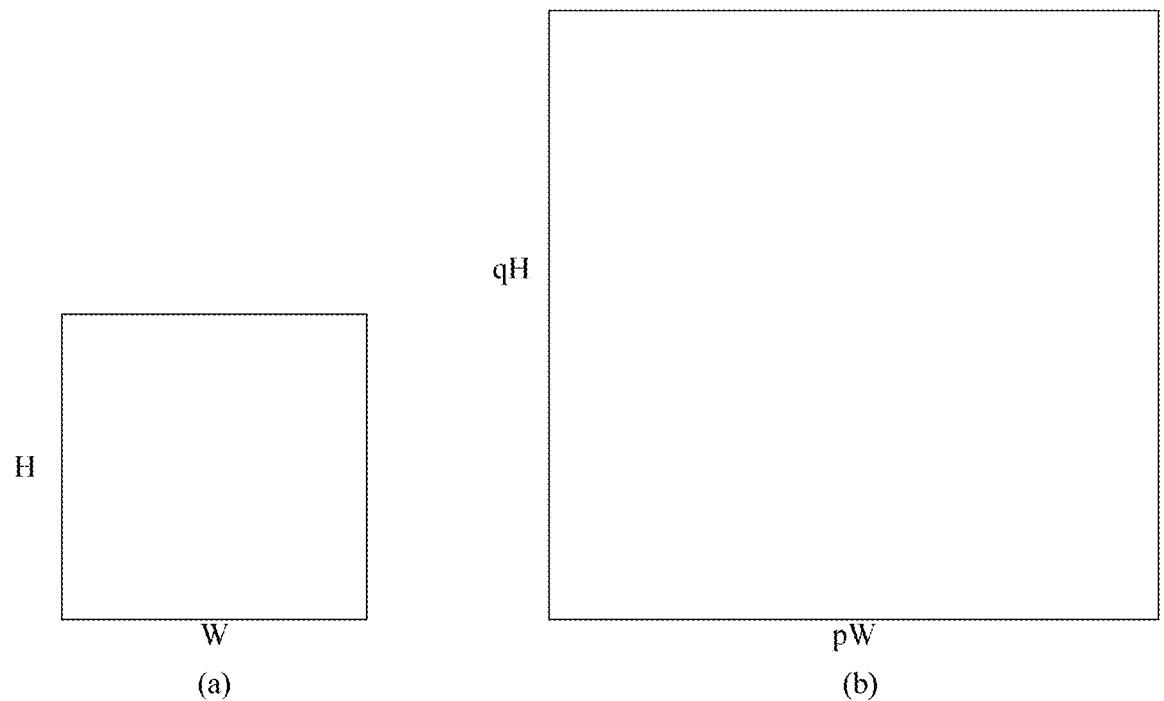
FIG. 2 is a schematic diagram of a normal display mode according to at least one embodiment of the present disclosure.

FIG. 2 is a schematic diagram of a normal display mode according to at least one embodiment of the present disclosure. In some exemplary embodiments, the normal display mode is applicable for ordinary office scenes, where there are no high requirements for display frame rates. Therefore, in a single-person mode and a multi-person mode of the normal display mode, the image processing terminal does not need to perform Multi-Resolution Rendering (MRS) on the original image data, and may directly add a mode label to the original image data and then transmit it to the image display terminal as target image data. Here, a resolution of the original image data needs to meet the requirements for an eye visibility PPD60. For example, the resolution of the original image data is at least 4K, for example, the resolution is 4096*2160.

In this exemplary embodiment, after receiving the target image data, the image display terminal may determine that it is currently in a normal display mode according to the mode label carried by the target image data, and perform image display on the display in a scanning display manner corresponding to the normal display mode. The scanning display manner corresponding to the normal display mode may include displaying an image to be displayed on the display according to a relationship between a resolution of the image to be displayed corresponding to the target image data and a resolution of the display at the image display terminal. In this example, the image to be displayed is an original image corresponding to the original image data. When the resolution of the original image is the same as that of the display, the original image is directly displayed on the display; and when the resolution of the original image is greater than that of the display, the original image is displayed on the display by reducing the resolution. However, this is not limited in the present exemplary embodiment.

In some examples, as shown in FIG. 2(a), the resolution of the original image is W*H; and as shown in FIG. 2(b), the resolution of the display at the image display terminal is pW*qH, where W, H, p and q are all positive numbers. For example, when p=2 and q=2, the image display terminal may display the original image on the display by reducing the resolution. Here, in the display process, the display performs scanning with two rows of sub-pixels as a group, and brightness data on the same column of sub-pixels on two adjacent rows of sub-pixels are the same.

In some exemplary embodiments, the two-dimensional display mode may be applied to game scenes, which have relatively high requirements for display frame rates. Therefore, in the two-dimensional display mode, the image processing terminal processes the original image data in an MRS manner, adds a mode label to the processed image data, to subsequently form target image data, and then transmit the target image data to the image display terminal. After receiving and analyzing the target image data, the image display terminal may determine a current display mode and perform image display according to a scanning display manner corresponding to the display mode.

Figure 3:
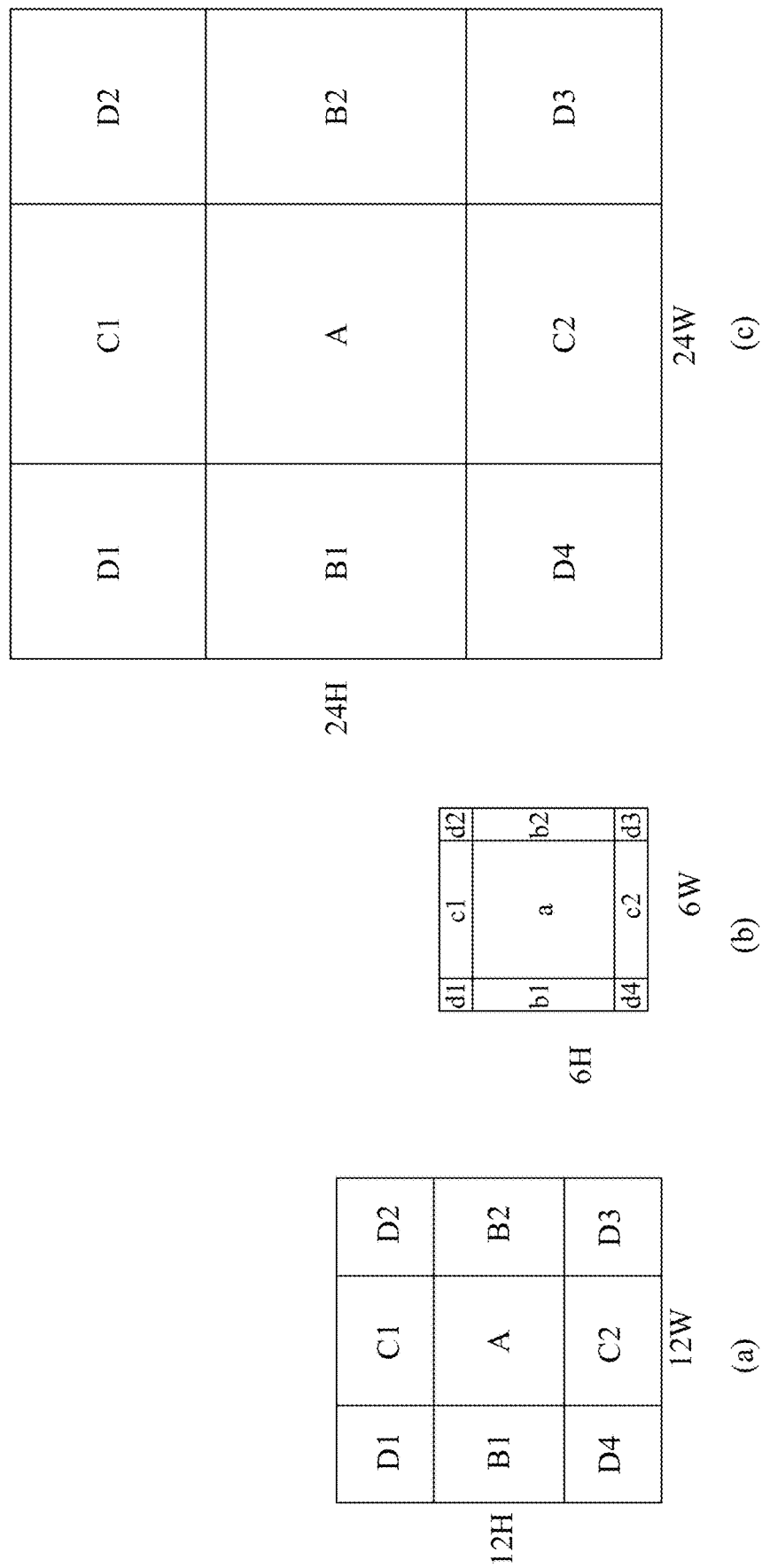
FIG. 3 is a schematic diagram of a single-person mode of a two-dimensional display mode according to at least one embodiment of the present disclosure.

FIG. 3 is a schematic diagram of a two-dimensional mode according to at least one embodiment of the present disclosure. FIG. 3 illustrates an image processing manner and a scanning display manner in a single-person mode corresponding to the two-dimensional display mode. In some examples, according to eye gaze parameters collected at the image display terminal, the original image corresponding to the original image data may be divided into one gaze area (for example, a high-definition area centered on an eye gaze point) and a plurality of non-gaze areas (for example, areas around the gaze area, of which resolutions may be reduced). As shown in FIG. 3(a), the original image may be divided into nine areas in a form of nine squares. Here, a gaze area A is a central area of the nine areas, and the gaze area A is a rectangular area. The plurality of non-gaze areas include an area C1 directly above the gaze area A, an area C2 directly below the gaze area A, an area B2 directly to the right of the gaze area A, an area B1 directly to the left of the gaze area A, an area D1 on the upper left of the gaze area A, an area D4 on the lower left of the gaze area A, an area D2 on the upper right of the gaze area A, and an area D3 on the lower right of the gaze area A. Each of the non-gaze areas may be rectangular.

In some examples, as shown in FIGS. 3(a) and 3(b), the gaze area A is sampled with an original resolution to obtain a gaze image a; the areas B1 and B2 are sampled by compressing a transverse resolution by four times and keeping a longitudinal resolution unchanged to obtain non-gaze images b1 and b2; the areas C1 and C2 are sampled by keeping the transverse resolution unchanged and compressing the longitudinal resolution by four times to obtain non-gaze images c1 and c2; and the areas D1 to D4 are sampled by compressing the transverse resolution by four times and compressing the longitudinal resolution by four times to obtain non-gaze images d1 to d4. In some examples, as shown in FIG. 3(a), a total quantity of pixels in the original image is 12 W*12H, a total quantity of pixels in the gaze image a is 4 W*4H, a total quantity of pixels in the non-gaze image b1 is W*4H, a total quantity of pixels in the non-gaze image b2 is W*4H, a total quantity of pixels in the non-gaze image c1 is 4 W*H, a total quantity of pixels in the non-gaze image c2 is 4 W*H, and a total quantity of pixels in each of the non-gaze images d1 to d4 is W*H. FIG. 3(b) illustrates a compressed image after the gaze image and the plurality of non-gaze images are spliced. As shown in FIG. 3(b), a total quantity of pixels in the compressed image is 6 W*6H. Compared with the original image, the transverse and longitudinal resolutions of the compressed image are a half of the resolutions of the original image, thus saving 75% of a bandwidth during data transmission from the image processing terminal to the image display terminal.

In some examples, after receiving the target image data, the image display terminal may switch to a scanning display manner corresponding to the two-dimensional display mode according to a mode label carried by the target image data by analyzing the target image data. As shown in FIG. 3(c), a resolution of the display at the image display terminal is 24 W*24H, and the image display terminal may perform image display on the display by reducing the resolution. Here, during the display process, the gaze area A and the non-gaze areas B1 and B2 of the display are scanned with two rows of sub-pixels as a group, wherein brightness data on the same column of sub-pixels on two adjacent rows of sub-pixels are the same; and the non-gaze areas C1, C2 and D1 to D4 of the display are scanned with eight rows of sub-pixels as a group, wherein brightness data on the same column of sub-pixels on eight adjacent rows of sub-pixels are the same.

Figure 4:
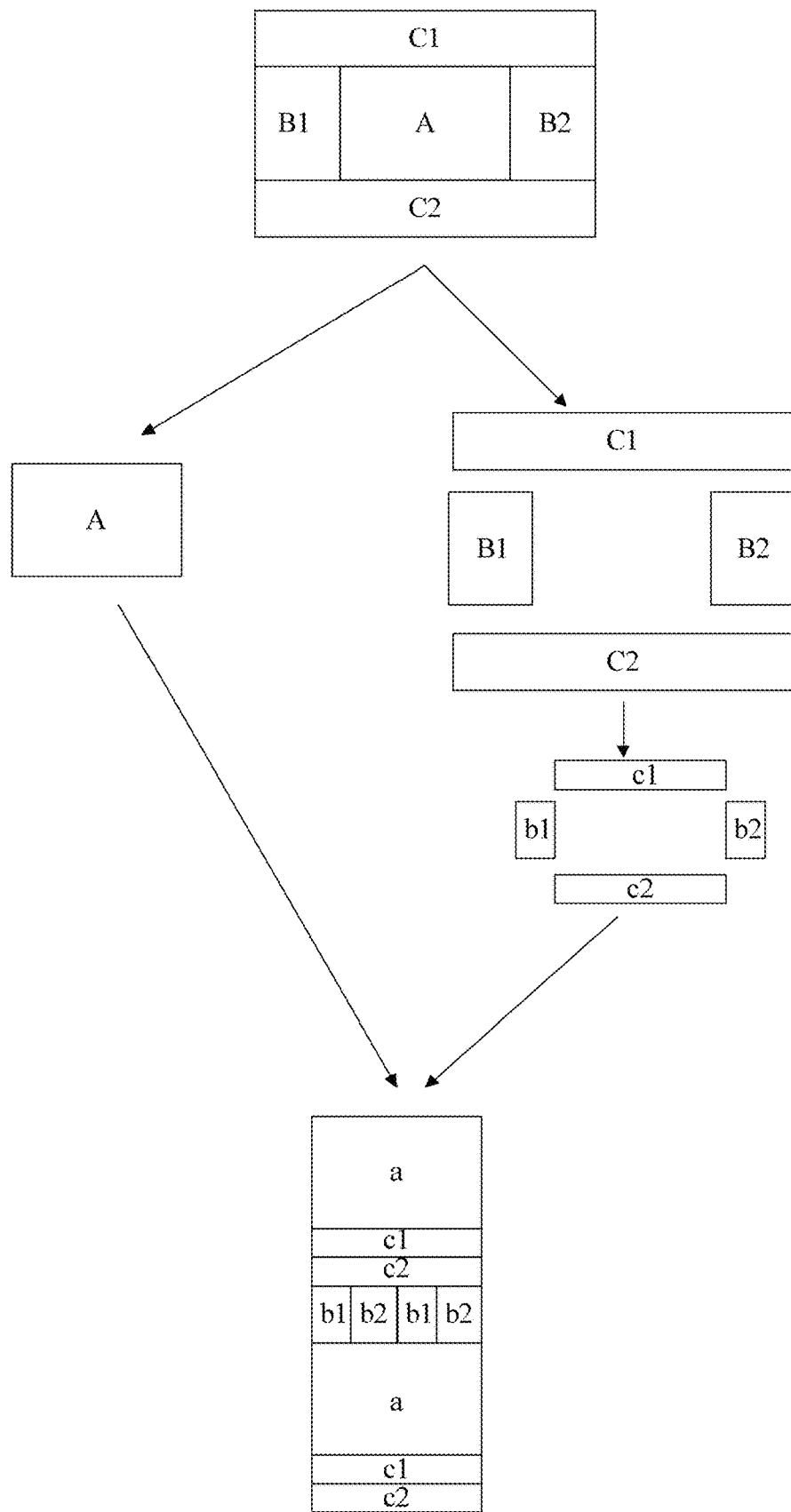
FIG. 4 is another schematic diagram of a single-person mode of a two-dimensional display mode according to at least one embodiment of the present disclosure.

FIG. 4 is another schematic diagram of a two-dimensional display mode according to at least one embodiment of the present disclosure. FIG. 4 illustrates another image processing manner of a single-person mode corresponding to the two-dimensional display mode. In some exemplary embodiments, as shown in FIG. 4, according to eye gaze parameters collected at the image display terminal, an original image corresponding to original image data may be divided into one gaze area A and a plurality of non-gaze areas. The plurality of non-gaze areas include: an area B1 directly to the left of the gaze area A, an area B2 directly to the right of the gaze area A, an area C1 above the gaze area A, and an area C2 below the gaze area A. The gaze area and the non-gaze areas may all be rectangular.

In some examples, as shown in FIG. 4, the gaze area A is sampled with an original resolution to obtain a gaze image a; and the areas B1, B2, C1 and C2 are sampled by compressing a transverse resolution by two times and compressing a longitudinal resolution by two times to obtain non-gaze images b1, b2, c1 and c2. The gaze image a and the non-gaze images b1, b2, c1 and c2 are arranged and combined to subsequently form target image data. Here, these images may be arranged and combined in an order of the gaze image first and then the non-gaze images. In this example, the compressed images after processing two frames of original images may be spliced and transmitted to the image display terminal for the purpose of saving the transmission bandwidth. In this example, the target image data carries image arrangement information, so that the image display terminal may perform image restoration after analyzing the target image data. In some examples, two frames of compressed images are spliced according to the principle of saving transmission bandwidth. However, the manner of splicing the compressed images is not limited in this exemplary embodiment.

Figure 5:
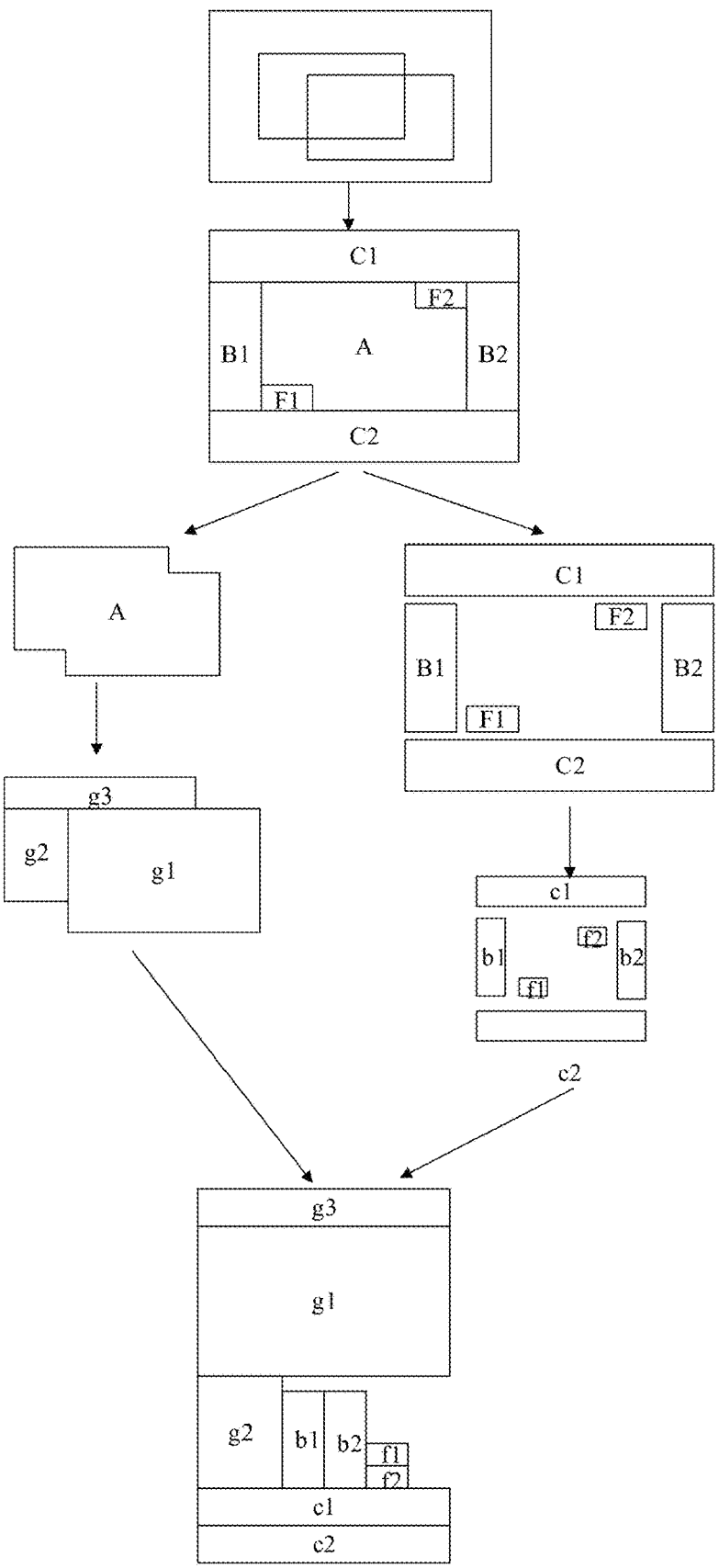
FIG. 5 is a schematic diagram of a multi-person mode of a two-dimensional display mode according to at least one embodiment of the present disclosure.

FIG. 5 is another schematic diagram of a two-dimensional display mode according to at least one embodiment of the present disclosure. FIG. 5 illustrates an image processing manner of a multi-person mode corresponding to the two-dimensional display mode. In some examples, as shown in FIG. 5, according to eye gaze parameters collected at the image display terminal, two gaze areas, which are overlapped with each other, may be determined, and a non-rectangular gaze area A may be obtained by combining the two gaze areas. The original image is divided into a gaze area A and a plurality of non-gaze areas. The plurality of non-gaze areas include an area B1 directly to the left of the gaze area A, an area B2 directly to the right of the gaze area A, an area C1 above the gaze area A, an area C2 below the gaze area A, an area F2 on the upper right of the gaze area A, and an area F1 on the lower left of the gaze area A. The non-gaze areas are all rectangular. In some other examples, according to the eye gaze parameters collected at the image display terminal, a plurality of independent gaze areas may be determined, that is, the gaze areas are not overlapped with each other. However, this is not limited in the present exemplary embodiment.

In some examples, as shown in FIG. 5, the gaze area A is sampled with an original resolution to obtain a gaze image, and the gaze image is segmented into three gaze sub-images g1 to g3, all of which are rectangular. The areas B1, B2, C1, C2, F1 and F2 are sampled by compressing a transverse resolution by two times and compressing a longitudinal resolution by two times to obtain non-gaze images b1, b2, c1, c2, f1 and f2. The gaze sub-images g1 to g3 and the non-gaze images b1, b2, c1, c2, f1 and f2 are arranged and combined, and image segmentation arrangement information is added to blank areas in the rearranged images to form target image data. The image segmentation arrangement information is used at the image display terminal when the image display terminal decompresses and restores the image to be displayed. Here, the rearrangement of the images may be performed in an order of arranging the gaze sub-images first and then the non-gaze images. However, this is not limited in the present exemplary embodiment. With this exemplary embodiment, the quality of pictures when viewed by many persons may be ensured while reducing the data transmission bandwidth and ensuring the image refresh rate, thus improving the user experience.

With regard to the scanning display manner corresponding to the two-dimensional display mode shown in FIG. 4 and FIG. 5, reference may be made to the description of the embodiment shown in FIG. 3, and therefore the scanning display manner will not be repeated here.

In some exemplary embodiments, the three-dimensional display mode is applicable for movie watching scenes, for example, watching three-dimensional movies. In the three-dimensional display mode, the image processing terminal processes original image data in an MRS manner, adds a mode label to the processed compressed image to form target image data, and then transmits the target image data to the image display terminal. The image display terminal displays an image on the display according to a scanning display manner corresponding to the three-dimensional display mode.

Figure 6:
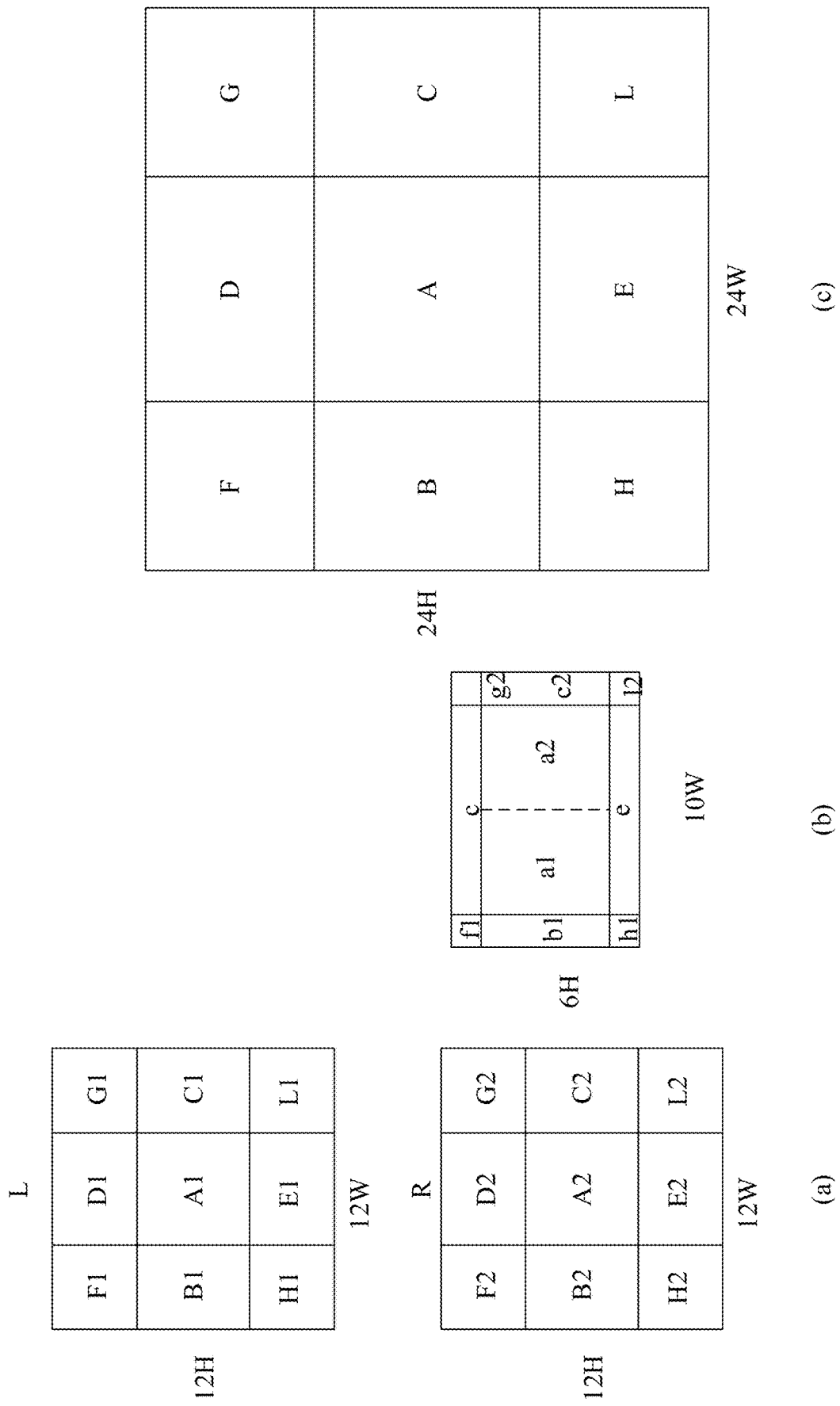
FIG. 6 is a schematic diagram of a three-dimensional display mode according to at least one embodiment of the present disclosure.

FIG. 6 is a schematic diagram of a three-dimensional display mode according to at least one embodiment of the present disclosure. FIG. 6 illustrates an image processing manner and a scanning display manner in a single-person mode corresponding to the three-dimensional display mode. In the three-dimensional display mode, original image data includes a Left (L) eye image and a Right (R) eye image. For example, the original image data may include two images taken by an LR camera. In some examples, according to eye gaze parameters collected at the image display terminal, the left eye image and the right eye image may be divided into gaze areas and non-gaze areas respectively. As shown in FIG. 6(a), the left eye image and the right eye image are divided in the same manner, that is, the left eye image and the right eye image are divided into nine areas in a form of nine squares. A middle area of the left eye image is a gaze area A1, a middle area of the right eye image is a gaze area A2, and remaining areas are non-gaze areas.

In some examples, as shown in FIGS. 6(a) and 6(b), the gaze areas A1 and A2 are sampled with an original resolution to obtain gaze images a1 and a2. The non-gaze area D1 of the left eye image and the non-gaze area D2 of the right eye image are sampled by keeping a transverse resolution unchanged and compressing a longitudinal resolution by four times to obtain two non-gaze images, which are spliced to obtain a non-gaze image c; and the non-gaze area E1 of the left eye image and the non-gaze area E2 of the right eye image are sampled by keeping the transverse resolution unchanged and compressing the longitudinal resolution by four times to obtain two non-gaze images, which are spliced to obtain a non-gaze image e. The non-gaze area B1 of the left eye image is sampled by compressing the transverse resolution by four times and keeping the longitudinal resolution unchanged to obtain a non-gaze image b1, and the non-gaze area C2 of the right eye image is sampled by compressing the transverse resolution by four times and keeping the longitudinal resolution unchanged to obtain a non-gaze image c2. The non-gaze areas F1 and H1 of the left eye image are sampled by compressing the transverse resolution by four times and compressing the longitudinal resolution by four times to obtain non-gaze images f1 and h1, and the non-gaze areas G2 and L2 of the right eye image are sampled by compressing the transverse resolution by four times and compressing the longitudinal resolution by four times to obtain non-gaze images g2 and l2. The obtained gaze images and non-gaze images may be spliced to obtain an image shown in FIG. 6(b). As shown in FIGS. 6(a) and 6(b), a total quantity of pixels of the original image data is 12 W*12H*2, a total quantity of pixels of the gaze images a1 and a2 is 4 W*4H*2, a total quantity of pixels of each of the non-gaze images b1 and c2 is W*4H, a total quantity of pixels of each of the non-gaze image c and e is 4 W*H*2, and a total quantity of pixels of each of the non-gaze images f1, h1, g2 and l2 is W*H. As shown in FIG. 6(b), a total quantity of pixels of an image obtained by splicing the gaze images and the non-gaze images is 10W*6H. In this example, in the process of data transmission from the image processing terminal to the image display terminal, about 79.1% of bandwidth may be saved for a single frame of data transmission.

In some examples, after receiving the target image data, the image display terminal may switch to a scanning display manner corresponding to the three-dimensional display mode according to a mode label carried by the target image data by analyzing the target image data. As shown in FIG. 6(c), a resolution of the display at the image display terminal is 24 W*24H, and in this case, the image display terminal may display an image on the display by reducing the resolution. Here, in a display process, the gaze area A and the non-gaze areas B and C of the display are scanned with two rows of sub-pixels as a group, wherein brightness data on the same column of sub-pixels on two adjacent rows of sub-pixels are the same; and the non-gaze areas D, E, F, G, H and L of the display are scanned with eight rows of sub-pixels as a group, wherein brightness data on the same column of sub-pixels on eight adjacent rows of sub-pixels are the same. Further, the gaze images a1 and a2 may be displayed in a fusion manner in the gaze area A. A manner of fusing the gaze images a1 and a2 is not limited in this exemplary embodiment.

In some examples, in the three-dimensional display mode, the image processing terminal may perform MRS processing on the left eye image to obtain a corresponding compressed image, and perform MRS processing on the right eye image to obtain a corresponding compressed image. Then, the two compressed images are spliced and then transmitted to the image display terminal, which displays the images through two displays respectively. In other words, in the three-dimensional display mode, the left eye image and the right eye image may be processed and displayed independently. However, this is not limited in the present exemplary embodiment.

In some examples, in the image processing manner in the multi-person mode of the three-dimensional display mode, the processing modes for the left eye image and the right eye image may refer to the image processing manner in the multi-person mode of the two-dimensional display mode, and therefore will not be repeated here. The scanning display manner in the multi-person mode of the three-dimensional display mode may be similar to that in the single-person mode, and therefore will not be repeated here.

In some exemplary embodiments, the stereoscopic light field display mode is applicable for design scenes. In the stereoscopic light field display mode, the image processing terminal processes original image data in an MRS manner, adds a mode label to the processed compressed image to form target image data, and then transmits the target image data to the image display terminal. The image display terminal displays an image on the display according to a scanning display manner corresponding to the stereoscopic light field display mode.

Figure 7:
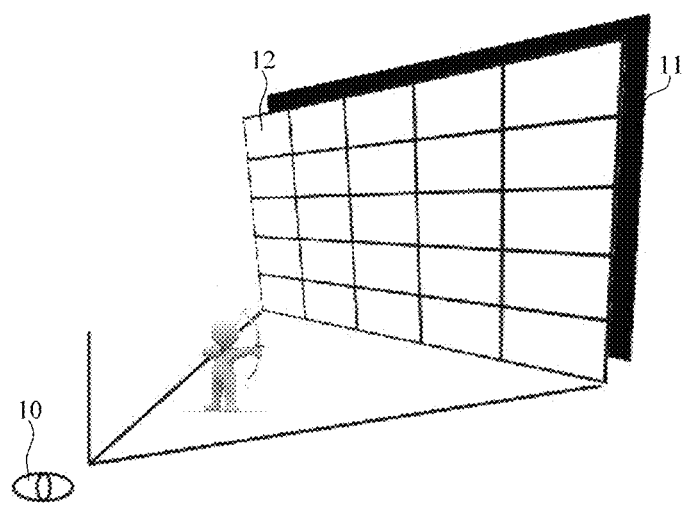
FIG. 7 is a schematic diagram of an image display terminal according to at least one embodiment of the present disclosure.

FIG. 7 is a schematic diagram of an image display terminal according to at least one embodiment of the present disclosure. In some exemplary embodiments, as shown in FIG. 7, the image display terminal may include a high-resolution display panel 11 and a lens array 12. A two-dimensional image displayed on the display panel 11 may be referred to as a unit image array. After refraction by the lens array 12, different parts of the unit image array intersect in space and enter eyes 10 of an observer in different directions to form a stereoscopic image.

Figure 8:
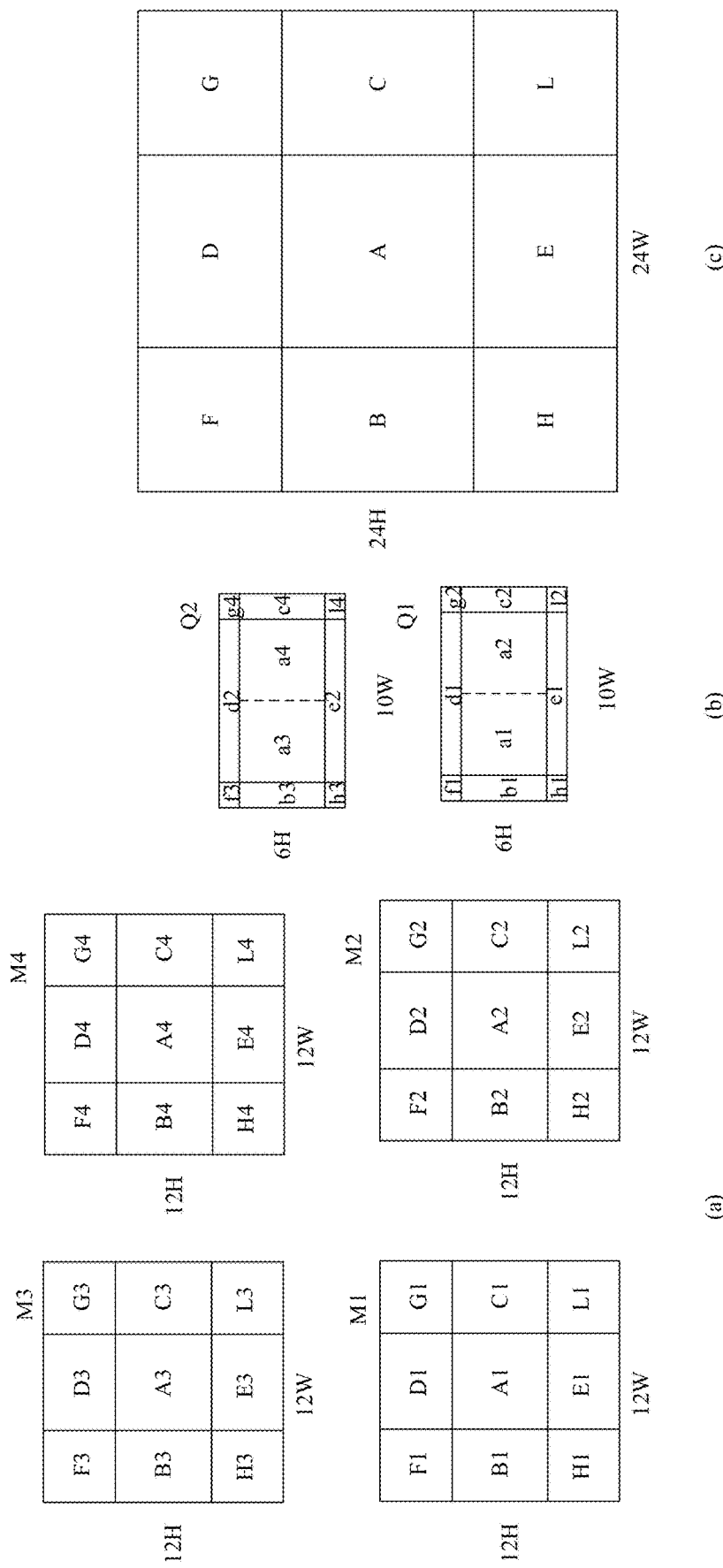
FIG. 8 is a schematic diagram of a stereoscopic light field mode according to at least one embodiment of the present disclosure.

FIG. 8 is a schematic diagram of a stereoscopic light field display mode according to at least one embodiment of the present disclosure. FIG. 8 illustrates an image processing manner and a scanning display manner in a single-person mode corresponding to the stereoscopic light field display mode. In the stereoscopic light field display mode, original image data includes a plurality of unit images, for example, the original image data includes four different images taken by a 2*2 camera array. In some examples, according to eye gaze parameters collected at the image display terminal, the plurality of unit images may be divided into gaze areas and non-gaze areas respectively. As shown in FIG. 8(a), the four unit images have the same resolution and are divided in the same manner, that is, each of the unit images are divided into nine areas in a form of nine squares. A middle area of each of the unit images is a gaze area, and remaining areas are non-gaze areas. The gaze areas and the non-gaze areas are all rectangular.

In some examples, as shown in FIG. 8(b), the gaze areas (i.e., the gaze areas A1, A2, A3 and A4) of the four unit images are sampled with an original resolution to obtain four gaze images a1 to a4. The non-gaze area D1 of the first unit image M1 and the non-gaze area D2 of the second unit image M2 are sampled by keeping a transverse resolution unchanged and compressing a longitudinal resolution by four times to obtain two non-gaze images, which are spliced to obtain a non-gaze image d1; and the non-gaze area E1 of the first unit image M1 and the non-gaze area E2 of the second unit image M2 are sampled by keeping the transverse resolution unchanged and compressing the longitudinal resolution by four times to obtain two non-gaze images, which are spliced to obtain a non-gaze image e1. The non-gaze area B1 of the first unit image M1 is sampled by compressing the transverse resolution by four times and keeping the longitudinal resolution unchanged to obtain a non-gaze image b1, and the non-gaze area C2 of the second unit image M2 is sampled by compressing the transverse resolution by four times and keeping the longitudinal resolution unchanged to obtain a non-gaze image c2. The non-gaze areas F1 and H1 of the first unit image M1 are sampled by compressing the transverse resolution by four times and compressing the longitudinal resolution by four times to obtain non-gaze images f1 and h1, and the non-gaze areas G2 and L2 of the second unit image M2 are sampled by compressing the transverse resolution by four times and compressing the longitudinal resolution by four times to obtain non-gaze images g2 and l2. The gaze images and the non-gaze images of the first unit image M1 and the second unit image M2 may be spliced to obtain a compressed image Q1 shown in FIG. 8(b). Similarly, gaze images and non-gaze images of the third unit image M3 and the fourth unit image M4 may be spliced to obtain a compressed image Q2 shown in FIG. 8(b). The compressed image Q1 and the compressed image Q2 may be transmitted to the image display terminal through two frames (for example, even and odd frames) of target image data.

In some examples, as shown in FIG. 8(a), a total quantity of pixels of the original image data is 12 W*12H*4, a total quantity of pixels of each of the gaze images a1, a2, a3 and a4 is 4 W*4H, a total quantity of pixels of each of the non-gaze images b1, c2, b3 and c4 is W*4H, a total quantity of pixels of each of the non-gaze images d1, d2, e1 and e2 is 4 W*H*2, and a total quantity of pixels of each of the non-gaze images f1, f3, h1, h3, g2, g4, l2 and l4 is W*H. As shown in FIG. 8(b), a total quantity of pixels of each of the compressed images Q1 and Q2 is 10W*6H. That is, a total quantity of pixels of a single frame of target image data is 10W*6H. In this example, in the process of data transmission from the image processing terminal to the image display terminal, about 89.76% of bandwidth may be saved for a single frame of data transmission.

In some examples, after receiving the target image data, the image display terminal may switch to a scanning display manner corresponding to the stereoscopic light field display mode according to a mode label carried by the target image data by analyzing the target image data. FIG. 8(c) illustrates displays corresponding to the first unit image and the second unit image, and the displays has a resolution of 24 W*24H. In this case, the image display terminal may display an image on the displays by reducing the resolution. Here, in a display process, the gaze area A and the non-gaze areas B and C of the displays are scanned with two rows of sub-pixels as a group, wherein brightness data on the same column of sub-pixels on two adjacent rows of sub-pixels are the same; and the non-gaze areas D, E, F, G, H and L of the displays are scanned with eight rows of sub-pixels as a group, wherein brightness data on the same column of sub-pixels on eight adjacent rows of sub-pixels are the same. Further, the gaze images a1 and a2 may be displayed in a fusion manner or a time-division multiplexing manner in the gaze area A. A manner of fusing and time-division multiplexing the gaze images a1 and a2 is not limited in this exemplary embodiment.

In some examples, in the stereoscopic light field display mode, for the plurality of unit images, the image processing terminal may perform MRS processing on each unit image to obtain a corresponding compressed image, and subsequently splice the plurality of compressed images and then transmit the spliced image to the image display terminal, which displays the spliced image through a plurality of displays respectively. In other words, in a three-dimensional display mode, the plurality of unit images may be processed and displayed independently. However, this is not limited in the present exemplary embodiment.

In some examples, in the image processing manner in the multi-person mode of the stereoscopic light field display mode, the processing manners for each unit image may refer to the image processing manner in the multi-person mode of the two-dimensional display mode, and therefore will not be repeated here. The scanning display manner in the multi-person mode of the stereoscopic light field display mode may be similar to that in the single-person mode, and therefore will not be repeated here.

In this exemplary embodiment, an image display system having a plurality of display modes is provided according to requirements for visual characteristics of eyes. By setting a data processing manner and a scanning display manner corresponding to each display mode, display requirements in different usage scenes may be met in a case of limited bandwidth, thereby ensuring display effects and reducing the transmission pressure.

Figure 9:
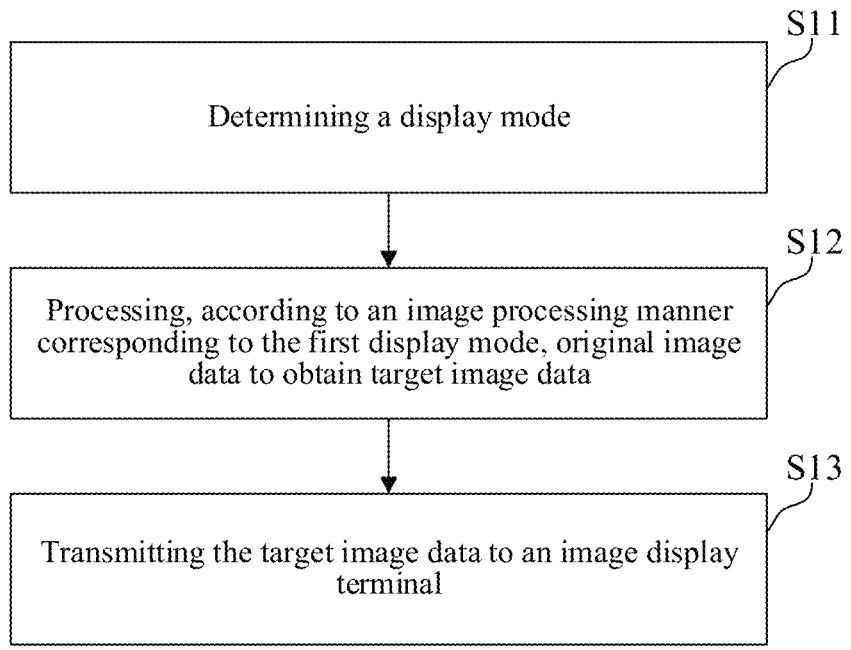
FIG. 9 is a schematic flowchart of an image processing method according to at least one embodiment of the present disclosure.

FIG. 9 is a flowchart of an image processing method according to at least one embodiment of the present disclosure. As shown in FIG. 9, at least one embodiment of the present disclosure further provides an image processing method, including:

In S11, determining a display mode;

In S12, processing, according to an image processing manner corresponding to the display mode, original image data to obtain target image data;

In S13, transmitting the target image data to an image display terminal, so that the image display terminal performs image display according to a scanning display manner corresponding to the display mode.

Here, a resolution of the target image data is less than or equal to that of the original image data, and the target image data carries indication information of the display mode.

In some exemplary embodiments, the display mode is one of the following modes: a normal display mode, a two-dimensional display mode, a three-dimensional display mode and a stereoscopic light field display mode. However, this is not limited in the present exemplary embodiment. In some examples, the corresponding display mode may be designed according to requirements in practical scenes.

In some exemplary embodiments, said determining a display mode includes at least one of the following steps: determining, according to a type of a running application, a display mode matched with the type of the application; and determining, in response to a user operation, a display mode selected by the user operation. In some examples, the image processing terminal may automatically identify the display mode, or confirm the display mode in combination with the user operation. However, this is not limited in the present exemplary embodiment. In some examples, the manner of identifying the display mode may be set according to the requirements in practical application scenes.

In some exemplary embodiments, before processing the original image data, the image processing method according to the present exemplary embodiment further includes: starting a single-person mode or a multi-person mode according to a quantity of persons who are watching at the same time at the image display terminal and eye gaze parameters of each person. Here, said processing, according to an image processing manner corresponding to the display mode, original image data to obtain target image data includes: processing the original image data according to an image processing manner in the single-person mode or the multi-person mode corresponding to the display mode to obtain the target image data. In this exemplary embodiment, by combining the determination of the multi-person mode with the determination of the display mode, the optimal display effect may be provided in different usage scenes to meet different needs of users.

In some exemplary embodiments, said starting a single-person mode or a multi-person mode according to a quantity of persons who are watching at the same time at the image display terminal and eye gaze parameters of each person includes: when the quantity of persons who are watching at the same time at the image display terminal is one, or the quantity of persons who are watching at the same time at the image display terminal is more than one and the eye gaze parameters of the plurality of persons indicate the same gaze area, starting the single-person mode; and when the quantity of persons who are watching at the same time at the image display terminal is more than one and the eye gaze parameters of the plurality of persons indicate at least two gaze areas, starting the multi-person mode. The manner of determining the gaze area according to the eye gaze parameters is not limited in the exemplary embodiment.

In some exemplary embodiments, the display mode is a normal display mode, and a resolution of the target image data obtained according to an image processing manner in a single-person mode or multi-person mode corresponding to the normal display mode is the same as that of the original image data. This exemplary embodiment may meet the requirements in common office scenes.

In some exemplary embodiments, the display mode is a two-dimensional display mode. said processing the original image data according to an image processing manner in the single-person mode or the multi-person mode corresponding to the display mode to obtain the target image data includes: dividing an original image corresponding to the original image data into at least one gaze area and a plurality of non-gaze areas according to the eye gaze parameters collected at the image display terminal, sampling the at least one gaze area using an original resolution to obtain at least one gaze image, and sampling the plurality of non-gaze areas using a compressed resolution to obtain a plurality of corresponding non-gaze images; and splicing the at least one gaze image and the plurality of non-gaze images to obtain the target image data. This exemplary embodiment may meet the requirements in game scenes.

In some exemplary embodiments, said processing the original image data according to an image processing manner in the multi-person mode corresponding to the display mode to obtain the target image data further includes:

segmenting the at least one gaze image to form a plurality of rectangular gaze sub-images; and rearranging the plurality of gaze sub-images and the plurality of non-gaze images to subsequently obtain the target image data. In this exemplary embodiment, image processing is performed for the multi-person mode in the two-dimensional display mode to meet the multi-person watching requirements.

In some exemplary embodiments, the display mode is a three-dimensional display mode, and the original image data includes a left eye image and a right eye image. Said processing the original image data according to an image processing manner in the single-person mode or the multi-person mode corresponding to the display mode to obtain the target image data includes: dividing, according to the eye gaze parameters collected at the image display terminal, the left eye image into at least one first gaze area and a plurality of first non-gaze areas, dividing the right eye image into at least one second gaze area and a plurality of second non-gaze areas, sampling the at least one first gaze area and the at least one second gaze area using an original resolution to obtain at least one first gaze image and at least one second gaze image, and sampling the plurality of first non-gaze areas and the plurality of second non-gaze areas using a compressed resolution to obtain a plurality of first non-gaze images and a plurality of second non-gaze images; and splicing the at least one first gaze image, the at least one second gaze image, the plurality of first non-gaze images and the plurality of second non-gaze images to obtain the target image data. In this exemplary embodiment, the requirements in three-dimensional watching scenes may be met.

In some exemplary embodiments, the display mode is a stereoscopic light field display mode, and the original image data includes a plurality of unit images. Said processing the original image data according to an image processing manner in the single-person mode or the multi-person mode corresponding to the display mode to obtain the target image data includes: for any unit image, dividing the unit image into at least one gaze area and a plurality of non-gaze areas according to the eye gaze parameters collected at the image display terminal, sampling the at least one gaze area using an original resolution to obtain at least one gaze image, and sampling the plurality of non-gaze areas using a compressed resolution to obtain a plurality of non-gaze images; and splicing the plurality of gaze images and the plurality of non-gaze images obtained according to the plurality of unit images to obtain the target image data, wherein the target image data includes a plurality of frames of image data. This exemplary embodiment may meet the requirements in stereoscopic design scenes.

The process of implementing the image processing method according to the exemplary embodiment may be known with reference to the above embodiments, and therefore will not be repeated here.

Figure 10:
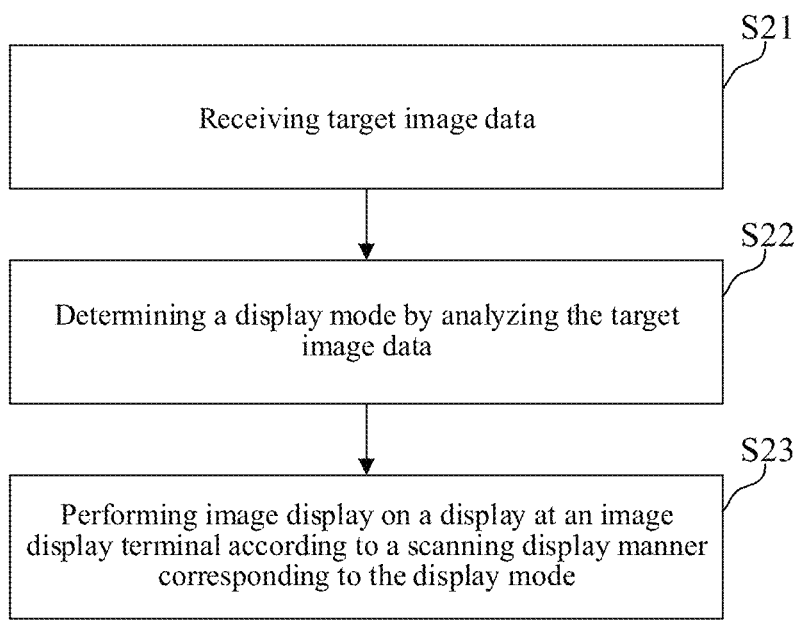
FIG. 10 is a schematic flowchart of an image display method according to at least one embodiment of the present disclosure.

FIG. 10 is a flowchart of an image display method according to at least one embodiment of the present disclosure. As shown in FIG. 10, the image display method according to this exemplary embodiment includes:

In S21, receiving target image data;

In S22, determining a display mode by analyzing the target image data; and

In S23, performing image display on a display at an image display terminal according to a scanning display manner corresponding to the display mode.

In some exemplary embodiments, the display mode is one of the following modes: a normal display mode, a two-dimensional display mode, a three-dimensional display mode, and a stereoscopic light field display mode.

In some exemplary embodiments, said performing image display on a display at an image display terminal according to a scanning display manner corresponding to the display mode includes when the display mode is a normal display mode, displaying an image to be displayed on the display according to a relationship between a resolution of the display at the image display terminal and a resolution of the image to be displayed corresponding to the target image data; when the display mode is a two-dimensional display mode, displaying a gaze image in the image to be displayed in a gaze area of the display and displaying a non-gaze image in the image to be displayed in a non-gaze area of the display by reducing the resolution according to the relationship between the resolution of the display at the image display terminal and the resolution of the image to be displayed; when the display mode is a three-dimensional display mode, displaying gaze images corresponding to a left eye image and a right eye image in a fusion manner in a gaze area of the display and displaying a non-gaze image in the image to be displayed in a non-gaze area of the display by reducing the resolution according to the relationship between the resolution of the display at the image display terminal and the resolution of the image to be displayed; and when the display mode is a stereoscopic light field display mode, displaying gaze images corresponding to a plurality of unit images in a fusion manner or time-division multiplexing manner in a gaze area of the display and displaying a non-gaze image in the image to be displayed in a non-gaze area of the display by reducing the resolution according to the relationship between the resolution of the display at the image display terminal and the resolution of the image to be displayed. This exemplary embodiment may meet the display requirements in various usage scenes.

The process of implementing the image display method according to the exemplary embodiment may be known with reference to the above embodiments, and therefore will not be repeated here.

Figure 11:
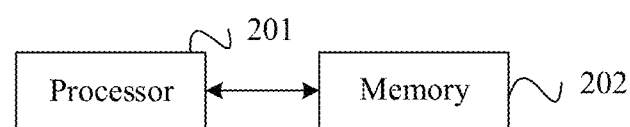
FIG. 11 is a schematic diagram of a terminal device according to at least one embodiment of the present disclosure.

FIG. 11 is a schematic diagram of a terminal device according to at least one embodiment of the present disclosure. As shown in FIG. 11, the terminal device (for example, a device such as a personal computer etc.) according to this exemplary embodiment includes a processor 201 and a memory 202. The processor 201 and the memory 202 may be connected through a bus. The memory 202 is adapted to store a computer program which, when executed by the processor 201, implements the steps of the image processing method according to the above embodiments.

In some examples, a structure of the terminal device shown in FIG. 11 does not constitute a limitation on the terminal device, and may include more or fewer components than shown, or combine some components, or provide different component arrangements.

In some examples, the processor 201 may include, but is not limited to, a processing apparatus such as a Microcontroller Unit (MCU) or a Field Programmable Gate Array (FPGA). The memory 202 may store software programs and modules of application software, such as program instructions or modules corresponding to the image processing method according to this exemplary embodiment. The processor 201 executes various functional applications and data processing, for example, implements the image processing method according to this exemplary embodiment, by running the software programs and modules stored in the memory 202. The memory 202 may include a high-speed random access memory, and may include a non-volatile memory such as one or more magnetic storage apparatuses, flash memory, or other non-volatile solid-state memory. In some examples, the memory 202 may include memories remotely located with respect to the processor 201, and these remote memories may be connected to the terminal device through a network. Examples of the above network include, but are not limited to, the Internet, the intranet, a local area network, a mobile communication network and combinations thereof.

Figure 12:
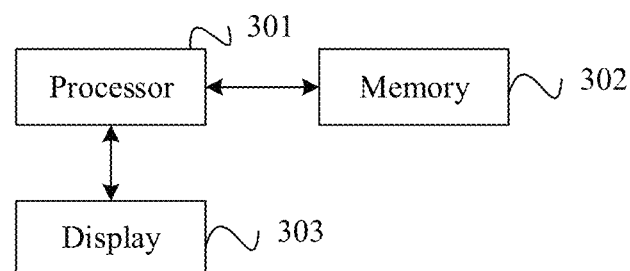
FIG. 12 is a schematic diagram of another terminal device according to at least one embodiment of the present disclosure.

FIG. 12 is a schematic diagram of another terminal device according to at least one embodiment of the present disclosure. As shown in FIG. 12, the terminal device according to this exemplary embodiment (for example, a device such as a head-mounted display etc.) includes a processor 301, a memory 302 and a display 303, wherein the processor 301, the memory 302, and the display 303 may be connected through a bus. The display 303 is adapted to provide a display interface; the memory 302 is adapted to store a computer program which, when executed by the processor 301, implements the steps of the image display method according to the above embodiments.

In some examples, a structure of the terminal device shown in FIG. 12 does not constitute a limitation on the terminal device, and may include more or fewer components than shown, or combine some components, or provide different component arrangements.

In some examples, the processor 301 may include, but is not limited to, a processing apparatus such as a Microcontroller Unit (MCU) or a Field Programmable Gate Array (FPGA). The memory 302 may store software programs and modules of application software, such as program instructions or modules corresponding to the image display method according to this exemplary embodiment. The processor 301 executes various functional applications and data processing, for example, implements the image display method according to this exemplary embodiment, by running the software programs and modules stored in the memory 302. The memory 302 may include a high-speed random access memory, and may also include a non-volatile memory such as one or more magnetic storage apparatuses, flash memory, or other non-volatile solid-state memory. In some examples, the memory 302 may include memories remotely located with respect to the processor 301, and these remote memories may be connected to the terminal device through a network. Examples of the above network include, but are not limited to, the Internet, the intranet, a local area network, a mobile communication network and combinations thereof.

In some examples, the display 303 may include a display panel, such as a liquid crystal display, an organic light emitting diode, etc. For example, a touch panel may overlay on a display panel, and when the touch panel detects a touch operation thereon or nearby, the touch panel transmits the touch operation to the processor 301 to determine a type of the touch event, and then the processor 301 provides corresponding visual output on the display panel according to the type of touch event. For example, the touch panel and the display panel may be used as two independent components to implement input and output functions of the terminal device, or the touch panel and the display panel may be integrated together to implement the input and output functions. However, this is not limited in the present embodiment.

At least one embodiment of the present disclosure further provides a computer readable storage medium storing a computer program which, when executed by a processor, implement the image processing method described above.

At least one embodiment of the present disclosure further provides a computer readable storage medium storing a computer program which, when executed by a processor, implement the image display method described above.

Those of ordinary skill in the art may understand that all or some of the acts in the method, the system, and functional modules/units in the device disclosed above may be implemented as software, firmware, hardware, and an appropriate combination thereof. In a hardware implementation, the division between functional modules/units mentioned in the above description does not necessarily correspond to the division of physical components. For example, a physical component may have plurality of functions, or a function or an act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on a computer readable medium, which may include a computer storage medium (or a non-transitory medium) and a communication medium (or a transitory medium). As is well known to those of ordinary skill in the art, the term "computer storage medium" includes volatile and nonvolatile, removable and non-removable media implemented in any method or technology for storing information (such as computer readable instructions, a data structure, a program module or other data). Computer storage media include, but are not limited to, RAMs, ROMs, EEPROMs, flash memories or other memory technologies, CD-ROMs, Digital Versatile Disk (DVD)s or other optical disk storage, magnetic cassettes, magnetic tapes, magnetic disk storage or other magnetic storage devices, or any other media that may be used to store desired information and may be accessed by a computer. Furthermore, it is well known to those of ordinary skill in the art that the communication medium typically contains computer readable instructions, a data structure, a program module, or other data in a modulated data signal such as a carrier or another transmission mechanism, or the like, and may include any information delivery medium.

Although the embodiments disclosed in the present disclosure are as described above, the described contents are only the embodiments for facilitating understanding of the present disclosure, which are not intended to limit the present disclosure. Those of ordinary skilled in the art to which the present disclosure pertains may make any modifications and variations in the form and details of implementation without departing from the spirit and the scope of the present disclosure. Nevertheless, the scope of patent protection of the present disclosure shall still be determined by the scope defined by the appended claims.

What we claim is:

1. An image processing method, comprising:
determining a display mode, wherein a display mode matched with a type of a running application is determined according to the type of the application, or a display mode selected by a user operation is determined in response to the user operation;
processing, according to an image processing manner corresponding to the display mode, original image data to obtain target image data, wherein a resolution of the target image data is less than or equal to that of the original image data, and the target image data carries indication information of the display mode, the indication information is added to a data header of the target image data; and transmitting the target image data to an image display terminal for the image display terminal to parse the indication information of the display mode from the data header of the target image data, and to determine the display mode according to the indication information, thus to allow the image display terminal to perform image display according to a scanning display manner corresponding to the display mode, wherein the display mode is one of the following modes: a normal display mode, a two-dimensional display mode, a three-dimensional display mode, and a stereoscopic light field display mode, wherein allowing the image display terminal to perform image display according to a scanning display manner corresponding to the display mode comprises:

in a case that the display mode is a normal display mode, displaying an image to be displayed on the display according to a relationship between a resolution of the display at the image display terminal and a resolution of the image to be displayed corresponding to the target image data;

in a case that the display mode is a two-dimensional display mode, displaying a gaze image in the image to be displayed in a gaze area of the display and displaying a non-gaze image in the image to be displayed in a non-gaze area of the display by reducing the resolution according to the relationship between the resolution of the display at the image display terminal and the resolution of the image to be displayed corresponding to the target image data;

in a case that the display mode is a three-dimensional display mode, displaying gaze images corresponding to a left eye image and a right eye image in a fusion manner in the gaze area of the display and displaying the non-gaze image in the image to be displayed in the non-gaze area of the display by reducing the resolution according to the relationship between the resolution of the display at the image display terminal and the resolution of the image to be displayed corresponding to the target image data; and in a case that the display mode is a stereoscopic light field display mode, displaying gaze images corresponding to a plurality of unit images in the fusion manner or a time-division multiplexing manner in the gaze area of the display and displaying the non-gaze image in the image to be displayed in the non-gaze area of the display by reducing the resolution according to the relationship between the resolution of the display at the image display terminal and the resolution of the image to be displayed corresponding to the target image data.

2. The image processing method according to claim 1, wherein, in the normal display mode, there is no need to perform Multi-Resolution Rendering (MRS) on the original image data, and in the two-dimensional display mode, the original image data is processed in the MRS manner.

3. The image processing method according to claim 2, wherein before processing the original image data, the method further comprises: starting a single-person mode or a multi-person mode according to a quantity of persons who are watching at the same time at the image display terminal and eye gaze parameters of each person; and processing, according to the image processing manner corresponding to the display mode, the original image data to obtain the target image data comprises: processing the original image data according to the image processing manner in the single-person mode or the multi-person mode corresponding to the display mode to obtain the target image data.

4. The image processing method according to claim 3, wherein starting the single-person mode or the multi-person mode according to the quantity of persons who are watching at the same time at the image display terminal and eye gaze parameters of each person comprises:

in a case that the quantity of persons who are watching at the same time at the image display terminal is one, or the quantity of persons who are watching at the same time at the image display terminal is more than one and the eye gaze parameters of the plurality of persons indicate a same gaze area, starting the single-person mode; and in a case that the quantity of persons who are watching at the same time at the image display terminal is more than one and the eye gaze parameters of the plurality of persons indicate at least two gaze areas, starting the multi-person mode.

5. The image processing method according to claim 3, wherein the display mode is a normal display mode, and the resolution of the target image data obtained according to the image processing manner in the single-person mode or the multi-person mode corresponding to the normal display mode is the same as that of the original image data.

6. The image processing method according to claim 3, wherein the display mode is a two-dimensional display mode; and processing the original image data according to the image processing manner in the single-person mode or the multi-person mode corresponding to the display mode to obtain the target image data comprises:

dividing an original image corresponding to the original image data into at least one gaze area and a plurality of non-gaze areas according to the eye gaze parameters collected at the image display terminal, sampling the at least one gaze area using an original resolution to obtain at least one gaze image, and sampling the plurality of non-gaze areas using a compressed resolution to obtain a plurality of corresponding non-gaze images; and splicing the at least one gaze image and the plurality of non-gaze images to obtain the target image data.

7. The image processing method according to claim 6, wherein processing the original image data according to the image processing manner in the multi-person mode corresponding to the display mode to obtain the target image data further comprises:

segmenting the at least one gaze image to form a plurality of rectangular gaze sub-images; and rearranging the plurality of gaze sub-images and the plurality of non-gaze images to subsequently obtain the target image data.

8. The image processing method according to claim 3, wherein the display mode is a three-dimensional display mode, and the original image data comprises a left eye image and a right eye image; and processing the original image data according to the image processing manner in the single-person mode or the multi-person mode corresponding to the display mode to obtain the target image data comprises:

dividing, according to the eye gaze parameters collected at the image display terminal, the left eye image into at least one first gaze area and a plurality of first non-gaze areas, dividing the right eye image into at least one second gaze area and a plurality of second non-gaze areas, sampling the at least one first gaze area and the at least one second gaze area using an original resolution to obtain at least one first gaze image and at least one second gaze image, and sampling the plurality of first non-gaze areas and the plurality of second non-gaze areas using a compressed resolution to obtain a plurality of first non-gaze images and a plurality of second non-gaze images; and splicing the at least one first gaze image, the at least one second gaze image, the plurality of first non-gaze images and the plurality of second non-gaze images to obtain the target image data.

9. The image processing method according to claim 3, wherein the display mode is a stereoscopic light field display mode, and the original image data comprises a plurality of unit images; and processing the original image data according to the image processing manner in the single-person mode or the multi-person mode corresponding to the display mode to obtain the target image data comprises:

for any unit image, dividing the unit image into at least one gaze area and a plurality of non-gaze areas according to the eye gaze parameters collected at the image display terminal, sampling the at least one gaze area using an original resolution to obtain at least one gaze image, and sampling the plurality of non-gaze areas using a compressed resolution to obtain a plurality of non-gaze images; and splicing a plurality of gaze images and the plurality of non-gaze images obtained according to the plurality of unit images to obtain the target image data, wherein the target image data comprises a plurality of frames of image data.

10. A terminal device, comprising: a memory and a processor, wherein the memory stores a computer program which, when executed by the processor, implements the image processing method according to claim 1.

11. A non-transitory computer readable storage medium, storing a computer program which, when executed by a processor, implements the image processing method according to claim 1.

12. An image display method, comprising:

receiving target image data, wherein the target image data carries indication information of a display mode, the indication information is added to a data header of the target image data;

parsing the indication information of the display mode from the data header of the target image data, and determining the display mode according to the indication information; and performing image display on a display at an image display terminal according to a scanning display manner corresponding to the display mode, wherein the display mode is one of the following modes: a normal display mode, a two-dimensional display mode, a three-dimensional display mode, and a stereoscopic light field display mode, wherein performing image display on a display at an image display terminal according to a scanning display manner corresponding to the display mode comprises:

in a case that the display mode is a normal display mode, displaying an image to be displayed on the display according to a relationship between a resolution of the display at the image display terminal and a resolution of the image to be displayed corresponding to the target image data;

in a case that the display mode is a two-dimensional display mode, displaying a gaze image in the image to be displayed in a gaze area of the display and displaying a non-gaze image in the image to be displayed in a non-gaze area of the display by reducing the resolution according to the relationship between the resolution of the display at the image display terminal and the resolution of the image to be displayed corresponding to the target image data;

in a case that the display mode is a three-dimensional display mode, displaying gaze images corresponding to a left eye image and a right eye image in a fusion manner in the gaze area of the display and displaying the non-gaze image in the image to be displayed in the non-gaze area of the display by reducing the resolution according to the relationship between the resolution of the display at the image display terminal and the resolution of the image to be displayed corresponding to the target image data; and in a case that the display mode is a stereoscopic light field display mode, displaying gaze images corresponding to a plurality of unit images in the fusion manner or a time-division multiplexing manner in the gaze area of the display and displaying the non-gaze image in the image to be displayed in the non-gaze area of the display by reducing the resolution according to the relationship between the resolution of the display at the image display terminal and the resolution of the image to be displayed corresponding to the target image data.

13. A terminal device, comprising: a display, a memory, and a processor, wherein the display is connected with the processor and is configured to provide a display interface, and the memory stores a computer program which, when executed by the processor, implements the image display method according to claim 12.

14. A non-transitory computer readable storage medium, storing a computer program which, when executed by a processor, implements the image display method according to claim 12.

15. An image display system, comprising: an image processing terminal and an image display terminal, wherein the image processing terminal is configured to determine a display mode, process original image data according to an image processing manner corresponding to the display mode to obtain target image data, and transmit the target image data to the image display terminal, wherein a resolution of the target image data is less than or equal to that of the original image data, and the target image data carries indication information of the display mode, the indication information is added to a data header of the target image data; and the image display terminal is configured to receive the target image data, determine the display mode according to the indication information, by parsing the indication information of the display mode from the data header of the target image data, and perform image display on a display at the image display terminal according to a scanning display manner corresponding to the display mode, wherein the display mode is one of the following modes: a normal display mode, a two-dimensional display mode, a three-dimensional display mode, and a stereoscopic light field display mode, wherein performing image display on a display at an image display terminal according to a scanning display manner corresponding to the display mode comprises:

in a case that the display mode is a normal display mode, displaying an image to be displayed on the display according to a relationship between a resolution of the display at the image display terminal and a resolution of the image to be displayed corresponding to the target image data;

in a case that the display mode is a two-dimensional display mode, displaying a gaze image in the image to be displayed in a gaze area of the display and displaying a non-gaze image in the image to be displayed in a non-gaze area of the display by reducing the resolution according to the relationship between the resolution of the display at the image display terminal and the resolution of the image to be displayed corresponding to the target image data;

in a case that the display mode is a three-dimensional display mode, displaying gaze images corresponding to a left eye image and a right eye image in a fusion manner in the gaze area of the display and displaying the non-gaze image in the image to be displayed in the non-gaze area of the display by reducing the resolution according to the relationship between the resolution of the display at the image display terminal and the resolution of the image to be displayed corresponding to the target image data; and in a case that the display mode is a stereoscopic light field display mode, displaying gaze images corresponding to a plurality of unit images in the fusion manner or a time-division multiplexing manner in the gaze area of the display and displaying the non-gaze image in the image to be displayed in the non-gaze area of the display by reducing the resolution according to the relationship between the resolution of the display at the image display terminal and the resolution of the image to be displayed corresponding to the target image data.

16. The image display system according to claim 15, wherein the image processing terminal is configured to determine the display mode in one of the following manners:

determining, according to a type of a running application, the display mode matched with the type of the application; and determining, in response to a user operation, the display mode selected by the user operation.

* * * * *